May 13, 1952    H. M. NELLY, JR., ET AL    2,596,785
METHOD OF ENRICHING NATURAL GAS
Filed July 8, 1946
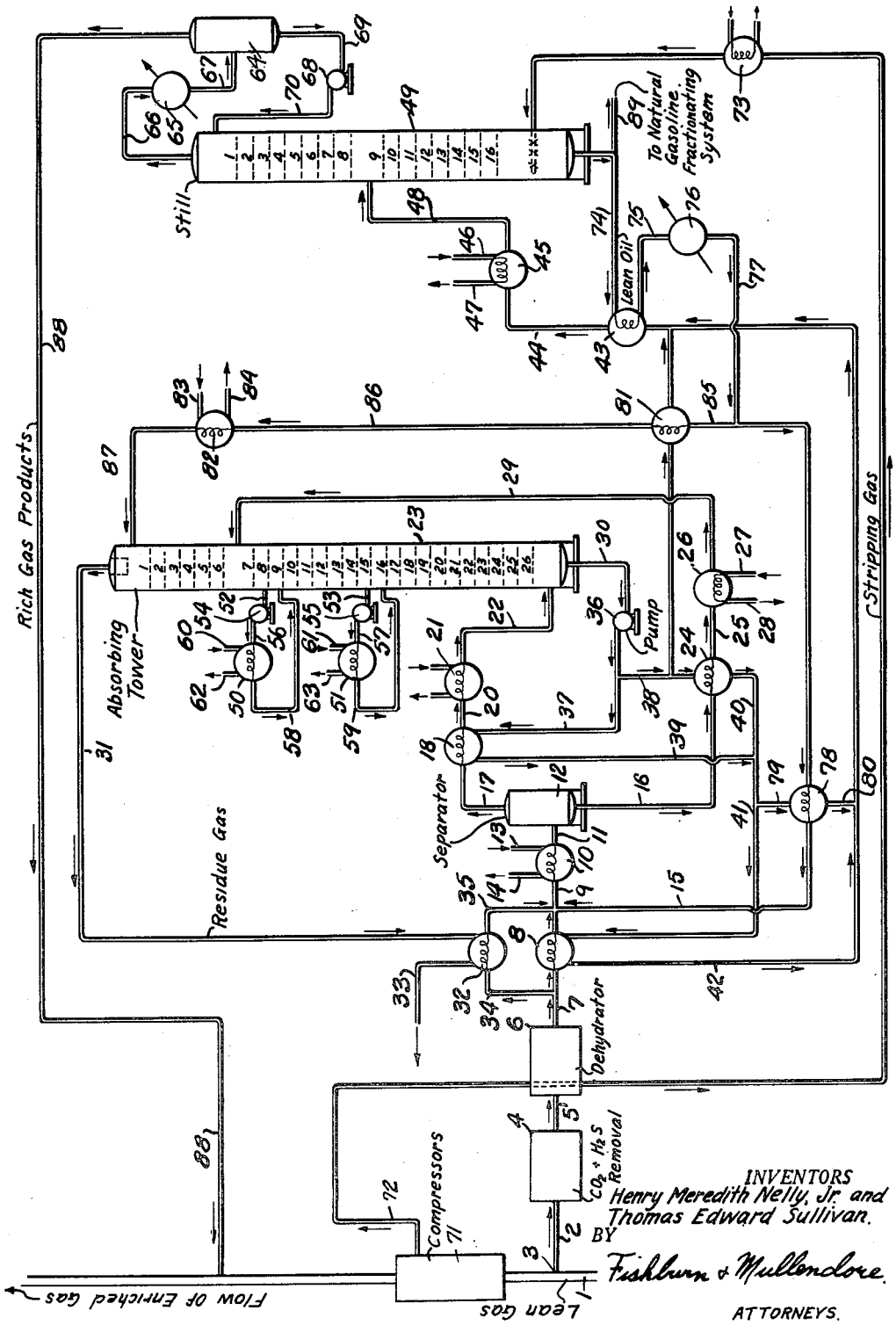
INVENTORS
Henry Meredith Nelly, Jr. and
Thomas Edward Sullivan.
BY
Fishburn & Mullendore.
ATTORNEYS.

Patented May 13, 1952

2,596,785

UNITED STATES PATENT OFFICE 2,596,785

METHOD OF ENRICHING NATURAL GAS

Henry Meredith Nelly, Jr., and Thomas Edward Sullivan, Houston, Tex., assignors to J. F. Pritchard & Co., Kansas City, Mo., a corporation of Missouri Application July 8, 1946, Serial No. 681,916

15 Claims. (Cl. 48—190)

This invention relates to a method of and apparatus for enriching natural gas by removal of inert gases contained therein, particularly nitrogen, and has for its principal object to provide for absorption of methane and heavier constituents from the inert constituents of the gas.

Other objects of the invention are to provide for delivering gas to a market or other place of consumption at a predetermined B. t. u. value; and to provide for removal of inert gas from a part of a natural gas flow for obtaining a product having a high B. t. u. value and blending the product with the unprocessed portion of a gas flow to maintain the predetermined B. t. u. value of the gas flow.

In accomplishing these and other objects of the invention hereinafter pointed out, we have provided an improved method and apparatus for enriching gas which is illustrated in the accompanying drawing wherein:

The single figure is a diagrammatic view of a gas enriching apparatus illustrated in association with a natural gas transportation pipe line.

Referring more in detail to the drawing:

1 designates a pipe line which may be the main trunk line of a transportation system for transporting natural gas from a source of supply to a market and through which gas is caused to flow at relatively high pressures as in customary practice and which gas may have a variable or relatively low B. t. u. value.

In carrying out the present invention, we contemplate processing the gas flow by conducting the gas, preferably a portion of the flow, to a processing plant through a pipe 2 having connection with the main gas flow line as indicated at 3 and through which gas is removed at a suitable pressure; for example 200 p. s. i. g.

The first step in processing the removed gas is to strip the gas of its carbon dioxide and hydrogen sulfide contents by conventional apparatus illustrated at 4 and which is connected with the outlet of the pipe 2. From the carbon dioxide and hydrogen sulfide stripping apparatus, the gas is delivered through a pipe 5 to a dehydration apparatus indicated at 6 where the gas is dehydrated to a dew point of approximately —110° F. If desired, the gas may be cooled somewhat before dehydration. The dehydrated gas is then discharged through a pipe 7 to a heat exchanger 8 wherein the gas is precooled to a temperature of approximately —40° F. before it is contacted with an absorbing liquid such as a lean oil, the mixture being discharged from the heat exchanger through a pipe 9 connected with a heat exchanger 10 wherein the mixture is cooled by a refrigerant such as ethylene, to a temperature of —60° F. and discharged through a pipe 11 to a separator 12 operating at a temperature of —60° F. and at approximately 190 p. s. i. g., the ethylene being delivered to the heat exchanger 10 through a pipe 13 at, for example, —78° F. and discharged through a pipe 14.

Upon contact of the gas with a lean oil some of the methane and heavier constituents of the gas are condensed at a temperature high enough that the latent heat of condensation can be removed with the ethylene so that only a single stage of compression is necessary to condense the ethylene, the lean oil being admitted through a pipe 15 that is connected with the pipe 9.

Attention is directed to the fact that about one-third of the latent heat to be removed from the system is removed through the heat exchanger 10 and a considerable saving of compressor horsepower is realized in removing the heat at about —60° F. The condensed methane, heavier constituents and lean oil are removed from the bottom of the separator 12 through a pipe 16 and the gas is removed from the top of the separator through a pipe 17 leading to a heat exchanger 18 where the temperature is reduced to —90° F. and delivered through a pipe 20 to a heat exchanger 21 wherein the gas is again cooled by ethylene refrigerant to reduce the temperature to —110° F. The gas at a temperature of —110° F. is discharged from the heat exchanger 21 through a pipe 22 leading to the bottom of an absorption tower 23. The condensate or liquid from the bottom of the separator is delivered through the pipe 16 and is cooled in a heat exchanger 24 to a temperature of —90° F. and discharged through a pipe 25 to a heat exchanger 26 where the temperature is again reduced, this time to the temperature of —110° F. through exchange with ethylene delivered through a pipe 27 and discharged from the heat exchanger through the pipe 28.

The liquid at a temperature of —110° F. is conducted through a pipe 29 and is discharged to an intermediate point of the absorber tower 23. As above mentioned, this liquid is a lean oil partially saturated with methane and flows downwardly in the absorber tower in counterflow to the gas delivered into the bottom of the tower through the pipe 22. Methane and heavier constituents of the gas flowing upwardly through the tower are absorbed by the descending flow of a lean oil and the mixture is removed from the bottom of the tower through a pipe 30.

The dry unabsorbed gas portion leaves the top of the absorber tower through a pipe 31 and is discharged from the system after its refrigeration is recovered by heat exchange with a portion of the incoming gas in heat exchanger 32. The gas is discharged from the heat exchanger 32 through a pipe 33 as residue gas which may be used for various purposes. This gas has a heating value of approximately 450 B. t. u. per cubic foot and contains about 60 per cent nitrogen.

In order to recover the refrigeration in the residue gas, a portion of the dehydrated gas may be diverted from the pipe 7 through a branch pipe 34 leading to the heat exchanger 32 where the gas is reduced to a temperature of —40° F. and returned to the pipe 9 through a pipe 35.

The rich liquid leaving the bottom of the absorber through the pipe 30 is delivered to a pump 36 which raises the pressure to approximately 635 pounds. The refrigeration in the rich liquid is recovered by using the liquid in the heat exchangers 8, 18 and 24, the refrigerant being delivered through branch pipes 37 and 38 to the heat exchangers 18 and 24 respectively. The liquid is discharged from the heat exchangers through branch pipes 39 and 40 leading to a common flow pipe 41 that is connected with the heat exchanger 8. After passing through the heat exchanger 8 the enriched liquid is discharged at a temperature of approximately 60° F. and conducted through a pipe 42 through a heater 43 from where the liquid is discharged through a pipe 44 to a heater 45 where the temperature is raised to 250° F. A heating medium such as steam is utilized in the heater 45 which is admitted through a pipe 46 and discharged through a pipe 47. The heated liquid is discharged from the heat exchanger through a pipe 48 having connection with a stripping tower 49 later described.

Intercoolers are provided in connection with the absorber tower 23 at points to remove the latent heat of condensation. The intercoolers are indicated at 50 and 51, the liquid being removed from the absorber through connections 52 and 53 respectively and delivered to pumps 54 and 55 having connection with the respective intercoolers by pipes 56 and 57 respectively. The cooled liquid is returned to the tower through pipes 58 and 59. The cooling medium is ethylene delivered to the respective intercoolers through pipes 60 and 61 at a temperature of —118° F. and discharged through pipes 62 and 63 respectively.

The absorbed methane and heavier constituents are separated from the lean oil in the stripping tower or still and discharged from the still into an overhead reflux drum 64 as a product gas, the gas having first been cooled by passing it through a water cooler 65, the water cooler being connected with the top of the tower by a pipe 66 and the water cooler is connected with the reflux drum through a pipe 67. Reflux is pumped from the bottom of the drum 64 by a pump 68 that is connected therewith by a pipe 69 and which discharges the reflux into the top of the stripping tower or still through a pipe 70 so as to prevent heavy ends of the lean oil from leaving the tower with the product gas.

Stripping is brought about in the stripping still by using a part of the gas from the pipe line 1 which is removed subsequent to the removal of the processed gas and which is raised to a pressure of approximately 600 p. s. i. g. by means of compressors indicated at 71, the stripping gas being discharged from the compressors through a branch pipe 72 leading to the bottom of the stripping tower or still and flows upwardly through the still and out the top thereof with the product gas.

Before the stripping gas is admitted to the bottom of the tower the gas is heated by steam in a heater 73 to a temperature of approximately 300° F. The oil leaves the bottom of the tower through a pipe 74 at a temperature of approximately 250° F. and the heat thereof is utilized in raising the temperature of the liquid being delivered to the still by passing the rich liquid through the heat exchanger 43. From the heat exchanger the hot liquid flows through a pipe 75 to a water cooler 76 wherein the temperature is reduced to approximately 90° F. and is discharged through a pipe 77 leading to a heat exchanger 78 wherein the temperature is reduced to —60° F. and the chilled liquid is discharged through the pipe 15 for mixture with the gas.

In order to utilize the low temperature of the liquid discharged through the pipes 41, a portion of the flow is diverted from the pipe 41 to a branch pipe 79 and is discharged through a pipe 80 connected with the pipe 42.

In order to prevent discharge of too much methane with the nitrogen at the top of the absorber, it is desirable to use some of the lean oil before it is saturated at —60° F. and flow it to the top of the absorber as trim oil. This is effected by initially cooling the lean oil in a heat exchanger 81 and then bringing the temperature of the trim oil to —110° F. by means of a heat exchanger 82 supplied with a refrigerant such as ethylene, the ethylene being supplied and discharged through pipes 83 and 84. The supply of trim oil is obtained from the pipe 77 through a pipe 85 that connects the pipe 77 and with the heat exchanger 81. The heat exchanger 81 is connected to the heat exchanger 82 through a pipe 86, the chilled liquid being discharged into the top of the tower 23 through a pipe 87.

The enriched gas from the reflux drum 64 is returned to the pipe line 1 through the pipe 88 that is connected with the line 1 on the discharge side of the compressors 71. It is important that the enriched gas be returned to the pipe line at pipe line pressure on the discharge side of the compressors 71 and this pressure is brought about in a very economical manner through increase in pressure by pumping the gas as a liquid in the rich oil from the bottom of the absorber by means of the pump 36. By compressing the gas in this manner considerable horsepower of compressors has been saved.

It is of further importance to realize that the lean oil leaving the bottom of the still 49 contains, in addition to the heavier components, a small percentage of methane, ethane and propane. In other words, the stripping in the still is not complete with respect to either methane or ethane. This is important, since the still is operated at 600 pounds so that the gas can be delivered without further compression, but this pressure of 600 pounds is above the critical pressure of the heavier components in the lean oil, therefore, if the lean oil was completely stripped it would not be possible to operate the still under a pressure sufficient to return the gas at 600 pounds without compressors.

If desired, natural gasolines may be removed from the oil by diverting a part of the oil through a pipe 89 to a conventional fractionation system (not shown).

While we have mentioned specific temperatures and pressures, it is obvious that such temperatures and pressures might be varied without departing from the spirit of the invention.

From the foregoing it is obvious that we have provided a method which can be economically employed in enriching gas and that the method results in saving of horsepower and raising the total volume of gas to the pressure maintained in the pipe line on the discharge side of the compressor 71. It is also obvious that the system can be operated to maintain a predetermined B. t. u. value for the gas being delivered through the pipe line at a constant value.

What we claim and desire to secure by Letters Patent is:

1. A method of enriching the B. t. u. content of natural gas including contacting the gas with an absorbing liquid, cooling the mixture for effecting condensation of and solution in the absorbing liquid of a portion of the gas, separating the liquid from the residue gas, additionally cooling the residue gas, passing the residue gas in counterflow with the liquid to effect further absorption of the methane and heavier constituents from the residue gas, and fractionating the liquid to obtain a gas fraction having a relatively high B. t. u. content.

2. A method of enriching the B. t. u. content of natural gas including, contacting the gas with an absorbing liquid, cooling the mixture for effecting condensation of and solution in the absorbing liquid of a portion of the gas, separating the liquid from the residue gas, additionally cooling the residue gas, passing the residue gas in counterflow with the liquid to effect further absorption of the methane and heavier constituents from the residue gas, additionally treating the residue gas with an unsaturated absorbing liquid to absorb remaining heavy constituents, collecting the liquids, and fractionating the collected liquids to obtain a gas fraction having a relatively high B. t. u. content.

3. A method of enriching natural gas including removing a portion of the natural gas, contacting the removed portion of gas with an absorbing liquid, cooling the mixture for effecting condensation of and solution in the absorbing liquid of a portion of the gas, separating the liquid constituents from the residue gas, additionally cooling the residue gas, passing the residue gas in contact with the separated liquid to effect further absorption of the methane and heavier constituents from the residue gas, raising the pressure on said liquid above the pressure of the untreated portion of the natural gas, fractionating the liquid at substantially said pressure to obtain a gas product having a relatively high B. t. u. content at a pressure greater than the pressure of the remaining portion of the natural gas, and mixing the gas product with the remaining portion of the natural gas.

4. The method of enriching the B. t. u. content of natural gas flow to a place of use including removing a portion of gas from the gas flow to be enriched, absorbing the methane and heavier constituents of the gas in an absorbing liquid, removing another portion of the gas flow to provide a stripping gas, pumping the liquid to a higher pressure, fractionating said liquid containing the absorbed constituents of the gas in contact with said stripping gas at said pumping pressure to obtain a gas product substantially higher in B. t. u. content, and admixing said gas product with the untreated natural gas to be enriched.

5. The method of enriching the B. t. u. content of natural gas flowing to a place of use including removing a portion of gas from the gas flow, increasing the pressure of the gas remaining in the flow, absorbing the methane and heavier constituents of the gas in an absorbing liquid pumping the liquid to a higher pressure, removing a portion of the gas flow at said increased pressure for use as a stripping gas, fractionating said liquid in contact with the stripping gas at said pumping pressure to obtain a gas product substantially higher in B. t. u. content, and admixing said gas product with the natural gas to be enriched.

6. A method of enriching the B. t. u. content of natural gas including removing a portion of the natural gas, dehydrating the removed portion of gas, contacting the dehydrated gas with an absorbing liquid, cooling the mixture for effecting condensation of and solution in the absorbing liquid of a portion of the gas, separating the liquid from the residue gas, additionally cooling the residue gas, passing the residue gas in counterflow with the separated liquid to effect further absorption of the methane and heavier constituents from the residue gas, increasing the pressure of said liquids to a pressure above that of the remaining portion of the natural gas, fractionating the liquids at said pressure to obtain a gas fraction having a relatively high B. t. u. value at a pressure above the pressure of the untreated portion of the natural gas, and mixing the gas fraction with the untreated portion of the natural gas.

7. A method of enriching natural gas including removing a portion of the natural gas, contacting the removed gas with an absorbing liquid, cooling the mixture for effecting condensation of and solution in the absorbing liquid of a portion of the gas, separating the liquid from the residue gas, additionally cooling the residue gas, passing the residue gas in counterflow with the separated liquid to effect further absorption of the methane and heavier constituents from the residue gas, increasing the pressure on said liquid by pumping the liquid into a stripping zone, heating said liquid, passing the heated liquid in counterflow with a stripipng gas at said pressure to obtain the lean oil and a gas product rich in B. t. u. content, and mixing the gas product with the untreated portion of natural gas.

8. A method of enriching natural gas including removing a portion of the natural gas, dehydrating the removed portion of gas, contacting the dehydrated gas with a hydrocarbon oil, cooling the mixture for effecting condensation of and solution in the absorbing liquid of a portion of the gas, separating the liquid constituents from the residue gas, additionally cooling the residue gas, passing the residue gas in counterflow with the separated liquid to effect further absorption of the methane and heavier constituents from the residue gas, increasing the pressure on said liquid to a pressure above that of the untreated portion of the natural gas, heating said liquid, passing the heated liquid in counterflow with a stripping gas at said pressure to obtain a lean oil and a gas product rich in B. t. u. content, and mixing the gas product with the remaining portion of natural gas.

9. A method of enriching the B. t. u. content of natural gas including removing a portion of the natural gas, dehydrating the removed portion of gas, contacting the dehydrated gas with a hydrocarbon oil, cooling the mixture for effecting condensation of and solution in the absorbing liquid of a portion of the gas, separating the liquid from the residue gas, additionally cooling the residue gas, passing the residue gas in counterflow with the separated liquid to effect further absorption of the methane and heavier constituents from the residue gas, increasing the pressure of said liquids to a pressure above that of the remaining portion of the natural gas, heating said liquid, passing the heated liquid in counterflow with a stripping gas at said pressure to obtain a lean oil and a gas product, mixing the gas product with the untreated portion of natural gas, and returning the lean oil for contact with the gas to be treated.

10. A method of enriching the B. t. u. content of natural gas including removing a portion of the natural gas, contacting the removed gas with a hydrocarbon oil, cooling the mixture for effecting condensation of and solution in the absorbing liquid of a portion of the gas, separating the liquid constituents from the residue gas, additionally cooling the residue gas, passing the residue gas in counterflow with the separated liquid to effect further absorption of the methane and heavier constituents from the residue gas, stripping the liquid with a dry gas to obtain a gas product having a high B. t. u. content and a stripped oil having a natural gas content, mixing the gas product with the untreated portion of natural gas, separating the natural gasoline content from the stripped oil, and returning the stripped oil for recontact with incoming natural gas at the place of contact.

11. A method of enriching the B. t. u. content of natural gas including removing a portion of the natural gas, contacting the removed gas with an absorbing liquid, cooling the mixture for effecting condensation of and solution in the absorbing liquid of a portion of the gas, separating the liquid from the residue gas, additionally cooling the residue gas, passing the residue gas in counterflow with the liquid to effect further absorption of the methane and heavier constituents from the residue gas, fractionating the liquid to obtain a gas fraction having a relatively high B. t. u. content, and mixing the gas fraction with the untreated portion of the natural gas.

12. A method of enriching the B. t. u. content of natural gas including removing a portion of the natural gas, contacting the removed gas with an absorbing liquid, cooling the mixture for effecting condensation of and solution in the absorbing liquid of a portion of the gas, separating the liquid from the residue gas, additionally cooling the residue gas, passing the residue gas in counterflow with the liquid to effect further absorption of the methane and heavier constituents from the residue gas, additionally treating the residue gas with an unsaturated absorbing liquid to absorb remaining heavy constituents, collecting the liquids, fractionating the collected liquids to obtain a gas fraction having a relatively high B. t. u. content, and mixing the gas fraction with the untreated portion of the natural gas.

13. The method of enriching the B. t. u. content of natural gas having a predetermined pressure including removing a portion of the gas, contacting the gas with an absorbing liquid, cooling the mixture for effecting condensation of and solution in the absorbing liquid of a portion of the gas, separating the liquid mixture from the residue gas, fractionating the liquid mixture in a fractionating zone to obtain a gas product substantially higher in B. t. u. content, maintaining a higher pressure in the fractionating zone than the pressure of the natural gas, and admixing the gas product at said higher pressure with the natural gas.

14. A method of enriching the B. t. u. content of natural gas, including contacting the gas with an absorbing liquid, cooling the mixture and absorbing liquid to a temperature below the temperature of liquefaction of the heavier hydrocarbon constituents of the gas, separating the liquid from the residue gas, additionally cooling the residue gas, passing the residue gas in counterflow with the liquid to effect further absorption of the methane and heavier constituents from the residue gas, and fractionating the liquid to obtain a gas having a relatively high B. t. u. content.

15. A method of enriching the B. t. u. content of natural gas including removing a portion of the natural gas, contacting the removed gas with a hydrocarbon oil, cooling the mixture for effecting condensation and solution in the hydrocarbon oil of a portion of the gas, separating the liquid constituents from the residue gas, passing the residue gas in counterflow with the separated liquid to effect further absorption of the methane and heavier constituents from the residue gas, heating said liquid, passing the heated liquid in counterflow with a stripping gas to obtain a gas product having an enriched B. t. u. content and a stripped oil having a natural gasoline content, mixing the residue gas with the untreated portion of natural gas, separating the natural gasoline content from the stripped oil, and returning the stripped oil for recontact with incoming natural gas at the place of contact.

HENRY MEREDITH NELLY, Jr.
THOMAS EDWARD SULLIVAN.

REFERENCES CITED

The following references are of record in the file of this patent:

UNITED STATES PATENTS

| Number | Name | Date |
|---|---|---|
| 1,422,183 | Curme | Jan. 11, 1922 |
| 1,429,175 | Thompson | Sept. 12, 1922 |
| 1,934,029 | Asbury | Nov. 7, 1933 |
| 1,942,131 | Baumann et al. | Jan. 2, 1934 |